April 19, 1932.          L. SKEEL ET AL          1,854,631
ROTARY CUTTER
Filed Jan. 16, 1929
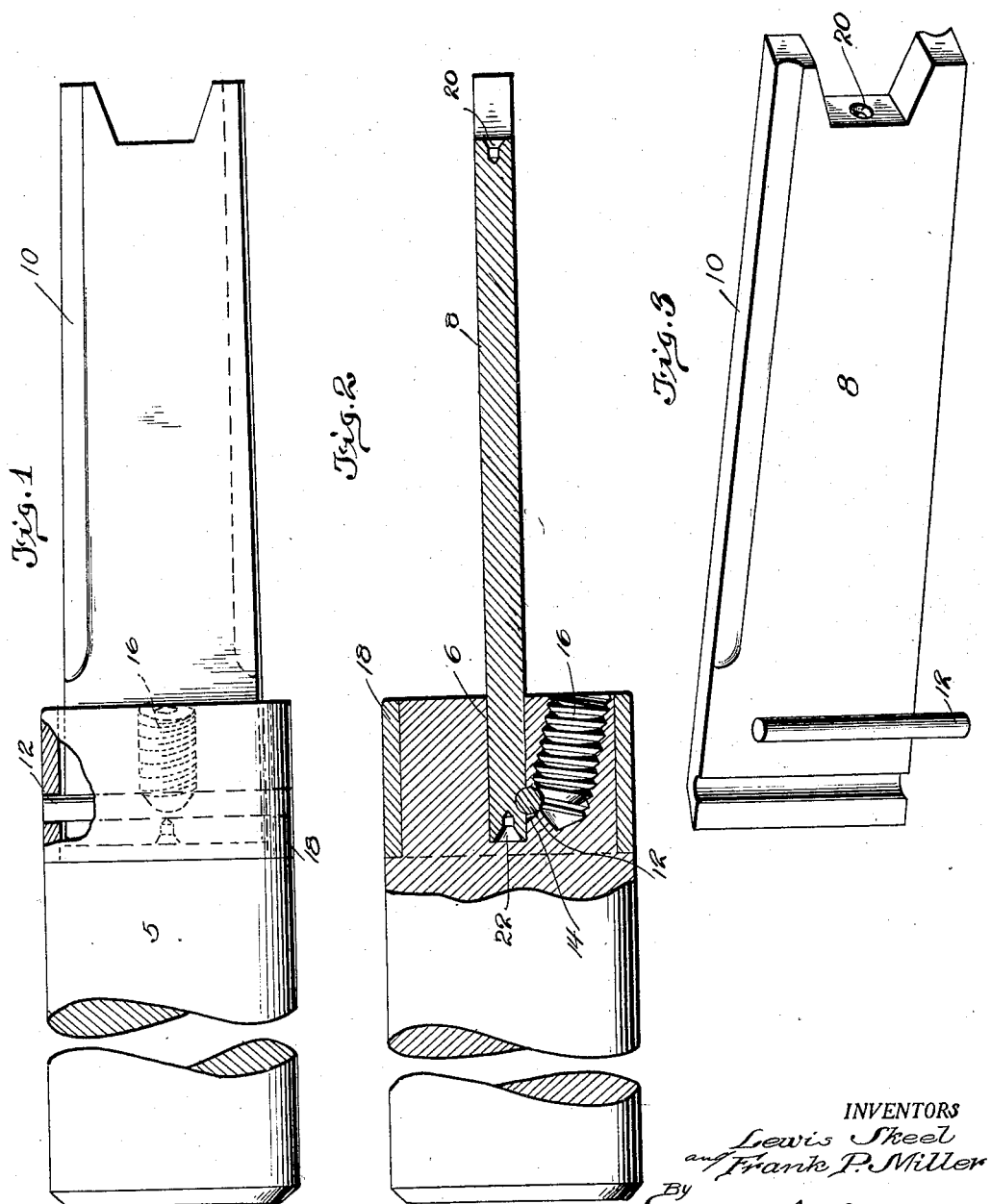
INVENTORS
Lewis Skeel
and Frank P. Miller
By
ATTORNEY.

Patented Apr. 19, 1932

1,854,631

UNITED STATES PATENT OFFICE

LEWIS SKEEL AND FRANK P. MILLER, OF MEADVILLE, PENNSYLVANIA

ROTARY CUTTER

Application filed January 16, 1929. Serial No. 332,834.

This invention relates to rotary cutters especially adapted for use in metal working although not necessarily restricted to such use.

The invention has, among other objects, the provision of means by which the blade of a taper reamer or the like may be attached securely to a carrier to resist shifting under the influence of the strain to which such blades are known to be subjected, the particular means by which the blade is connected to the carrier being readily releasable from binding engagement with the blade to allow of the transverse adjustment of the blade or the complete removal thereof for renewal or resharpening.

The invention will further be found to embody a rotary blade in which the cutting portions thereof are extended substantial distances beyond the forward center hole of the blade so that the blade may be resharpened a number of times without disturbing such forward center hole, it being understood, of course, that when the blade is mounted in a grinder for resharpening, the aforesaid center hole is employed in conjunction with a similar hole at the rear end of the blade to allow of the rotation of the blade about the longitudinal center thereof in the usual manner.

Another feature of the invention resides in the means by which spreading of the blade engaging portion of the carrier under the strain incident to the use of the tool is avoided.

In the accompanying drawings forming a part of this application and in which like numerals are employed to designate like parts throughout the same, Figure 1 is a fragmentary side elevation of the improved tool, Figure 2 is a fragmentary longitudinal sectional view through the tool, Figure 3 is a perspective of a cutting blade forming a part of the invention.

In the drawings wherein for the purpose of illustration is shown a preferred embodiment of the invention the numeral 5 designates a carrier in the nature of a shank, the rear end portion of which is designed to fit in a machine spindle.

Figure 2 illustrates that the forward portion of the carrier 5 is reduced externally and is provided with a diametrical groove 6 of a width to snugly receive the attaching or rear portion of a blade 8. The single flat blade 8 may be tapered slightly toward the forward end and has the opposite edges thereof sharpened as indicated at 10 for cutting engagement with the wall of a previously formed hole in metal or other material.

In carrying out the invention, one wall of the groove 6 and the opposed surface of the blade 8 are provided with mating transversely extending channels receiving a locking pin 12. The pin receiving channel in the wall of the groove 6 is designated by the numeral 14 and as shown in Figure 2 is slightly greater in cross sectional area than the mating channel in the blade 8 so that the locking screw 16 may move the pin bodily into firm binding engagement with the blade to seat the blade in the groove 6.

The mating channels for the reception of the pin 12 are extended out through opposite sides of the carrier for the insertion and removal of the pin 12. As shown in Figure 2, the locking screw 16 is threaded into the carrier 5 at an angle to the axis of the carrier and is provided with a sharply tapered truncated forward portion for pressure engagement with the locking pin 12.

The rear portion of the locking screw 16 is constantly exposed and highly accessible for engagement by a tool suitable for the purpose of tightening or loosening the blade. It is believed to be clear that it is a simple matter to adjust the blade transversely of the carrier to accurately center the same to the hole being reamed.

The transverse groove 6 extending entirely across the forward portion of the carrier and intersecting the axis of the carrier defines what might be said to be a pair of partly severed segmental blade engaging members and to avoid increased separtion of these segmental members under the influence of the strain accompanying the use of the tool the same are embraced closely by a ferrule 18. The ferrule 18 not only has the function of bracing the forward portion of the carrier, but extends over and substantially closes the ends of the groove 6.

The illustrated reduction in the diameter of the forward portion of the cylindrical carrier 5 disposes the outer surface of the ferrule 18 flush with the surface of the carrier. If desired, the ferrule 18 may be integral with the carrier 5 and in either case will be provided with openings for the passage of the pin 12.

As shown in Figure 2, the blade is provided with center holes 20 and 22, through the medium of which the blade may be attached in the usual manner to a grinder for the purpose of resharpening the oppositely located cutting portions 10. It is important to observe that the forward portion of the blade 8 is recessed rather deeply between the cutting portions 10 and that the center hole 20 is in the inner wall of such recess so that the cutting portions of the blade are extended substantial distances beyond the forward center hole. By reason of this arrangement, the tool may be resharpened a number of times without disturbing the forward center hole.

Having thus described the invention what is claimed is:

1. In a reamer, a rotatable support having the forward end thereof formed with a diametrical groove, a rotary blade having the rear portion thereof in said groove, a laterally movable locking pin parallel to and engaging said blade, said support being provided with a threaded opening, a screw threaded into said opening and engaging said pin to force the same into binding engagement with said blade, said opening being extended out through the forward end of said support to afford access to the screw from the forward end of the support, and a ferrule embracing the diametrically grooved forward portion of said support to hold the same against spreading.

2. In a reamer, a rotatable support having the forward end thereof formed with a diametrical groove, a rotary blade having the rear portion thereof in said groove, a locking pin parallel to and engaging said blade, said support being provided with a threaded opening, a screw threaded into said opening and engaging said pin, said opening being extended out through the forward end of said support to afford access to the screw from the forward end of the support, and a ferrule embracing the diametrically grooved forward portion of said support and holding the same against spreading under the influence of said screw, said ferrule being provided with means for the passage of said locking pin.

In testimony whereof we affix our signatures.

LEWIS SKEEL.
FRANK P. MILLER.